United States Patent [19]

Herzog et al.

[11] Patent Number: 4,502,759
[45] Date of Patent: Mar. 5, 1985

[54] ADJUSTABLE SERVO-CONTROLLED OUTSIDE REAR VIEW MIRROR

[75] Inventors: Siegfried Herzog, Steinenbronn; Hans-Peter Jordan, Schonaich; Henryk Nölscher; Wilhelm Bauer, both of Sindelfingen; Christian Grabner, Gechingen; Wilhelm Klein, Aidlingen; Rolf Krügener; Max Bausch, both of Sindelfingen; Gerard Nüssle, Aidlingen, all of Fed. Rep. of Germany

[73] Assignee: Daimler-Benz Aktiengesellschaft, Fed. Rep. of Germany

[21] Appl. No.: 465,636

[22] Filed: Feb. 10, 1983

[30] Foreign Application Priority Data

Feb. 11, 1982 [DE] Fed. Rep. of Germany ....... 3204791

[51] Int. Cl.³ .............................................. G02B 7/18
[52] U.S. Cl. .................................. 350/636; 248/487; 350/634
[58] Field of Search ............... 350/289, 307, 288, 310; 248/487, 486

[56] References Cited

U.S. PATENT DOCUMENTS

| 3,873,196 | 3/1975 | Hess | 350/289 |
| 4,234,246 | 11/1980 | Wunsch et al. | 350/289 |
| 4,247,172 | 1/1981 | Wunsch et al. | 350/289 |
| 4,365,867 | 12/1982 | Siefert | 350/289 |
| 4,422,724 | 12/1983 | Otsuka et al. | 350/307 |

FOREIGN PATENT DOCUMENTS

| 2822681 | 11/1979 | Fed. Rep. of Germany | 350/289 |
| 2941034 | 4/1981 | Fed. Rep. of Germany | 350/289 |

Primary Examiner—Jon W. Henry
Attorney, Agent, or Firm—Craig & Burns

[57] ABSTRACT

The invention relates to a servo-controlled adjustable outside rear view mirror for vehicles, having a stationary mirror housing and a mirror shell which carries the reflector and is able to move therein. In the mirror housing there is provided an interchangeable drive unit for the vertical and horizontal adjustment of the reflector, said drive unit being affixed to the back of the mirror housing or of the mirror shell. The invention aims at providing a broad vibrationless bearing surface for the mirror shell. Furthermore, by means of a simple control switch the mirror shall be adjustable in the same manner about a geometrically defined horizontal and vertical axis. The invention also aims at providing a wedge-shaped convergent, aerodynamic mirror housing. For this purpose, the drive unit is coupled by means of a movable plate to the rear of the mirror shell which can turn on a vertical axis, but the swivel connection has torsional strength about the horizontal axis. At the same time, the swivel connection allows for length adjustment between the plate and the mirror shell. The intermediate plate and the mirror shell are separately suspended on gimbals at independent bearing points located on the horizontal swivel axis of the mirror shell. The drive unit is pushed as far as possible to the vehicle-side housing edge, and the bearing point of the mirror shell as close as possible to the external housing edge of the mirror housing.

5 Claims, 4 Drawing Figures

ADJUSTABLE SERVO-CONTROLLED OUTSIDE REAR VIEW MIRROR

The invention relates to apparatus for a servo-controlled adjustable outside rear vision mirror for vehicles as is well known and exemplified by Accepted West German Patent Specification No. 25 02 189.

According to the invention, an adjustable servo-controlled outside rear view mirror for vehicles may have a stationary mirror housing and a mirror shell carrying a reflector and able to move therein, a drive unit for the vertical and horizontal adjustment of the reflector which is detachably fixed in the mirror housing in the area of the back of the mirror shell, the drive unit having a plate which is connected to the mirror shell and is suspended on gimbals at a bearing point and further having a frame or the like, wherein movable driven members of servo motors engage substantially horizontally and substantially vertically beside the bearing point at right angles to the reflector, wherein the connection between the plate, frame or the like and the mirror shell is designed to pivot on a vertical axis but with torsional strength in the horizontal direction so that length adjustment is possible in the horizontal direction between the plate, frame or the like on the one hand and the mirror shell on the other. The mirror shell may be suspended on gimbals in the mirror housing on a separate, second, bearing point located substantially horizontally beside the bearing point of the frame, the frame or the like. The plate, frame or the like is deposited within the mirror housing as close as possible to the ferret vehicle side housing edge and the second bearing point as close as possible to the external housing edge.

In mirrors of prior construction the plate, frame or the like is rigidly coupled to the mirror shell and the gimballed bearing point of the plate serves at the same time as the corresponding bearing point for the mirror shell. An advantage of the prior mirrors is that because of the inter-changeability of the drive unit and its attachment to the background of the mirror housing, the corresponding mirror can be equipped without costly modifications either for servo-controlled adjustment (on the passenger's side in left-hand drive construction) or for manual adjustment by means of a linkage (on the driver's side in right-hand drive construction). Another advantage of the outside rear view mirrors of the prior art is that for the vertical and horizontal adjustment of the reflector only one single drive point need to be moved. This allows for an extremely simple design of the corresponding control switch for a meaningful actuation of the reflector. These two requirements are also essential for the present invention.

A drawback of the mirrors of the past has been that the bearing area is relatively small, so that the reflector tends to vibrate, which is very disturbing for a clear view to the rear. Especially if the width of the reflector in horizontal direction is substantially greater than its height, there is a very strong tendency toward vibration in this direction on account of the corresponding mass distribution.

Admittedly, other adjustable servo-controlled outside rear vision mirrors are known in the prior art, where the bearing area for the mirror shell is relatively large and, accordingly, the tendency toward vibration is small, see for example unexamined West German Specification 29 52 084. However, these outside rear view mirrors require a special design for the mirror housing, because the drive units are integrated into the vehicle-side housing edge of the mirror housing. Furthermore, through the bearing points are distributed on a horizontal and on a vertical axis, relatively complex control switches are needed for a meaningful mirror adjustment, because both servomotors must be activated simultaneously at least during the adjustment of the mirrors about a vertical axis. Other adjustable servo-controlled outside view mirrors with a mirror shell which is supported on the external housing edge are not burdened by complex control switches, but they are relatively susceptible to vibration due to a comparatively small bearing area of the mirror shell, at least about the horizontal axis.

The invention meets the requirements for the widest possible bearing area for the mirror shell in either direction, in addition to the two requirements mentioned in the introduction, which have already been satisfied by the prior mirrors of this type, with the swivel axes still continuing to lie substantially horizontal and vertical.

This is achieved by the connection between the plate, frame or the like in the mirror shell design so as to pivot on a vertical axis but with a torsional strength in the horizontal direction, so that the length adjustment is possible in the horizontal direction between the plate, frame or the like, on the one hand and the mirror shell on the other and wherein the mirror shell is suspended on gimbals in the mirror housing on a separate second bearing point located substantially horizontally beside the bearing point of the plate, the frame or the like, and the plate, frame or the like is disposed within the mirror housing as close as possible to the vehicle side housing edge and the second bearing point is disposed as close as possible to the external housing edge.

Due to the movable coupling of the plate to the mirror shell, both the plate and the mirror shell can be pivoted separately on a horizontal and on a vertical axis, for which purpose only a single servomotor need to be connected. On account of the movement of the gimballed suspension point on the external housing edge of the mirror, the mirror housing can have the streamlined wedge-shaped outer contour, which is not possible with a suspension on gimbals of the mirror shell near the center, or which implies a substantially larger outer contour. Because the bearing points or the points of application of the servomotors are pushed far away from each other, vibration isolation is achieved especially in the direction of the width.

Accordingly, it is an object of the invention to provide an improved servo-controlled adjustable outside rear vision for vehicles.

It is another object of the invention to provide an improved adjustable servo-controlled outside rear view mirror for vehicles having a stationary mirror housing, a mirror shell carrying the reflector and able to move therein, a drive unit for the vertical and horizontal adjustment of the reflector which is detachably fixed in the mirror housing in the area of the back of the mirror shell, the drive unit having a plate which is connected to the mirror shell and is suspended on gimbals at a varying plate and further having a frame or the like, wherein movable driven members of servomotors engage substantially horizontally and substantially vertically beside the bearing point at right angles to the reflector, the connection between the plate frame or the like and the mirror shell being designed so as to pivot on a vertical axis but with torsional strength in a horizontal direction, so that length adjustment is possible in the horizontal direction between the plate, frame or the like on the one hand and the mirror shell on the other, the mirror shell being suspended on gimbals in the mirror housing on a separate, second, bearing point located substantially horizontally beside the bearing point of the plate, frame or the like, the plate, frame or the like being disposed within the mirror housing as close as possible to the vehicle side housing edge and the second bearing point as close as possible to the external housing edge.

It is another object of the invention to provide an improved servo-controlled adjustable outside rear vision mirror wherein a swivel-mounted connection between a plate, frame or the like and a mirror shell is formed, on the one hand by two vertical swivel pins which are in alignment with, and point away from, each other and are spaced apart by the plate, frame or the like and, on the other hand, by two corresponding horizontal recesses on the back of the mirror shell which receive the swivel pins.

It is another object of the invention to provide an improved servo-controlled adjustable outside rear vision mirror wherein an axial distance of two swivel pins is substantially equal to or larger than the distance between, on the one hand, a bearing point of a plate, frame or the like, and a point vertically there with respect thereto at which a corresponding driven member of a servomotor is applied.

It is another object of the invention to produce an improved servo-controlled adjustable outside rear vision mirror wherein swivel pins and recesses are symmetrical with respect to a horizontal swivel axis of a mirror shell.

It is another object of the invention to provide an adjustable outside rear view mirror having a mirror housing mounted to a vehicle at a vehicle housing edge and having an external housing edge with a reflector, a mirror shell means for moving the reflector, means for supporting the mirror shell means at a first point on said mirror housing proximate the external housing edge, a plate for supporting the mirror shell on a first axis vertical with respect to the reflector and proximate the vehicle side housing edge, means enaging said plate means at a second point proximate said first axis and horizontally disposed with respect to said first point for moving said reflector about a second axis passing through said first point, and a means engaging said plate means at a third point remote from said second point for moving the reflector about a third axis passing through said first point.

These and other objects, features, and advantages of the present invention will become more apparent from the following description when taken in connection with the accompanying drawings which show, for the purposes of illustration only, one embodiment in accordance with the present invention, and wherein.

Figure 1:
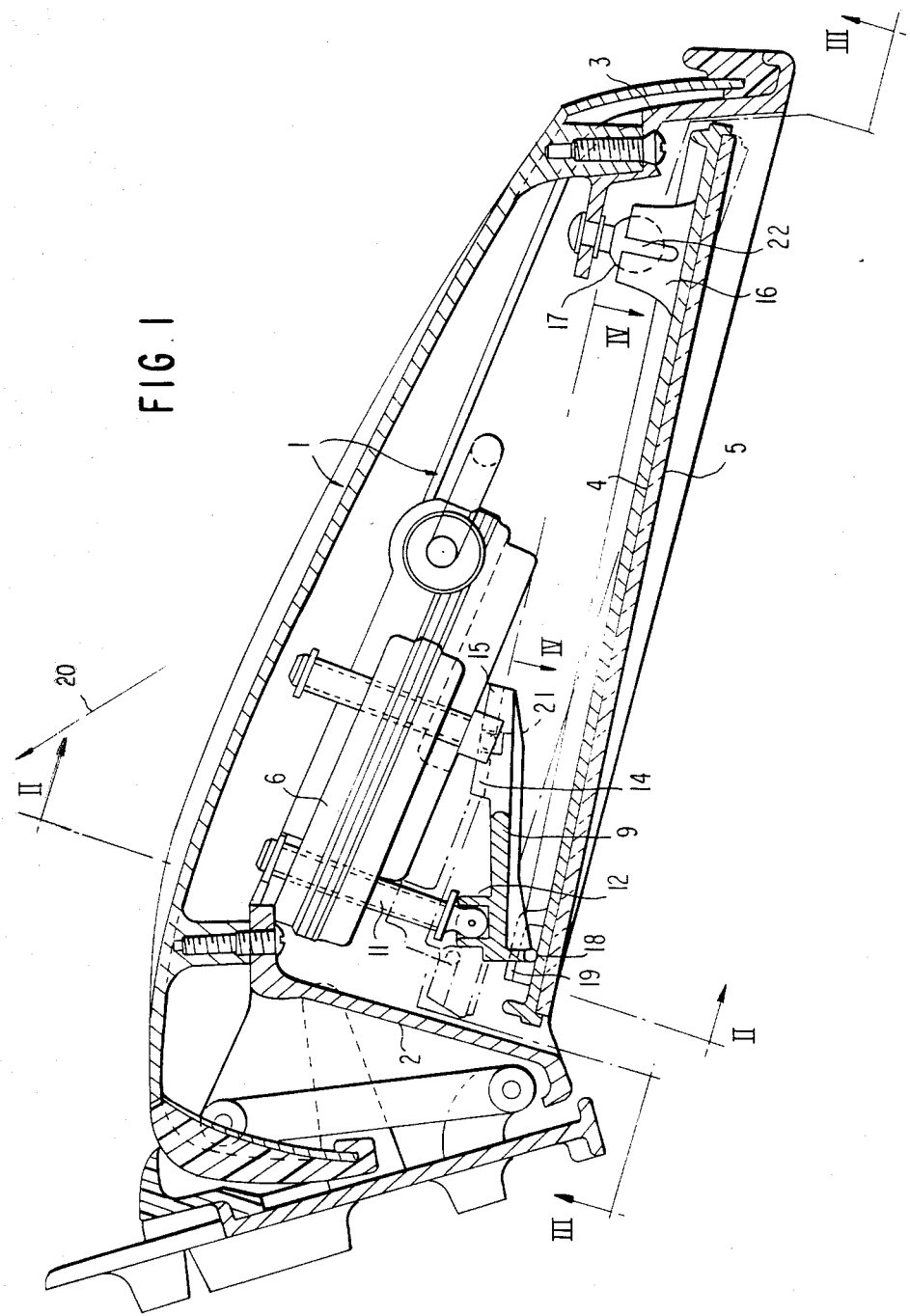
FIG. 1 is a horizontal section through an outside rear view mirror according to the invention.

With reference to the figures wherein like reference numerals represent like elements, the outside rear view mirror shown consists of a sectional mirror housing 1, FIG. 1, which is usually affixed to the vehicle. This outside mirror has been provided on the passenger's side of a vehicle designed for left-hand driving, so that the vehicle-side housing edge 2 is to the left of the mirror housing 1 and the external housing edge 2 is to the right. The mirror housing 1 is attached to the vehicle in such a way that it can pivot on two mutually independent vertical swivel axes in the event of a collision. A mirror shell 4 is swivel-mounted in the mirror housing 1, said mirror shell 4, in turn, being fixedly connected to reflector 5. The servo-controlled remotely adjustable outside rear view mirror further has a drive unit 6, FIG. 2, which is detachably fixed with its rear to the interior of the mirror housing. Thus, the vehicle-side housing edge 2 remains free from installation hardware. More particularly, no servomotors are integrated into the housing edge 2. As a result, such a mirror housing 1 can be used without further provisions even for installing a manually operated adjusting linkage such as needed for a driver-side mirror in vehicles designed for right-hand driving. A manually operated adjusting linkage is less susceptible to trouble and less expensive than a remote-controlled servo adjusting linkage. The more expensive remote-controlled servo adjusting linkage is only meaningful for the passenger's mirror which cannot be reached manually.

Figure 2:
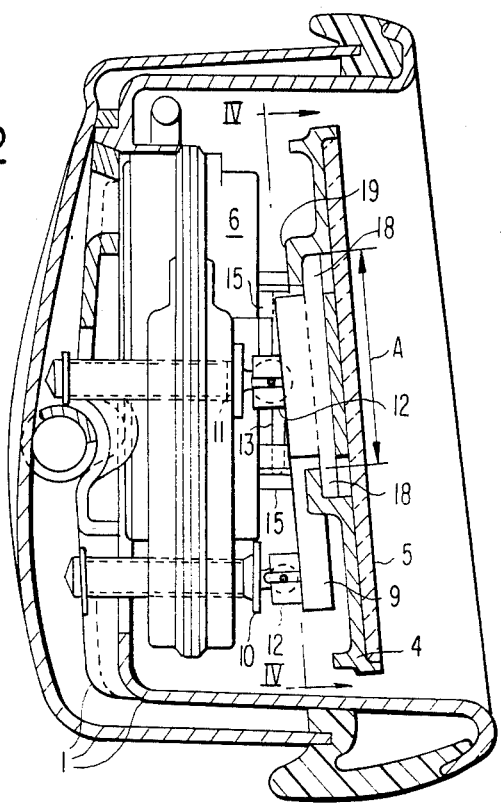
FIG. 2 is a vertical section through the mirror of FIG. 1 taken along the line II—II.
Figure 3:
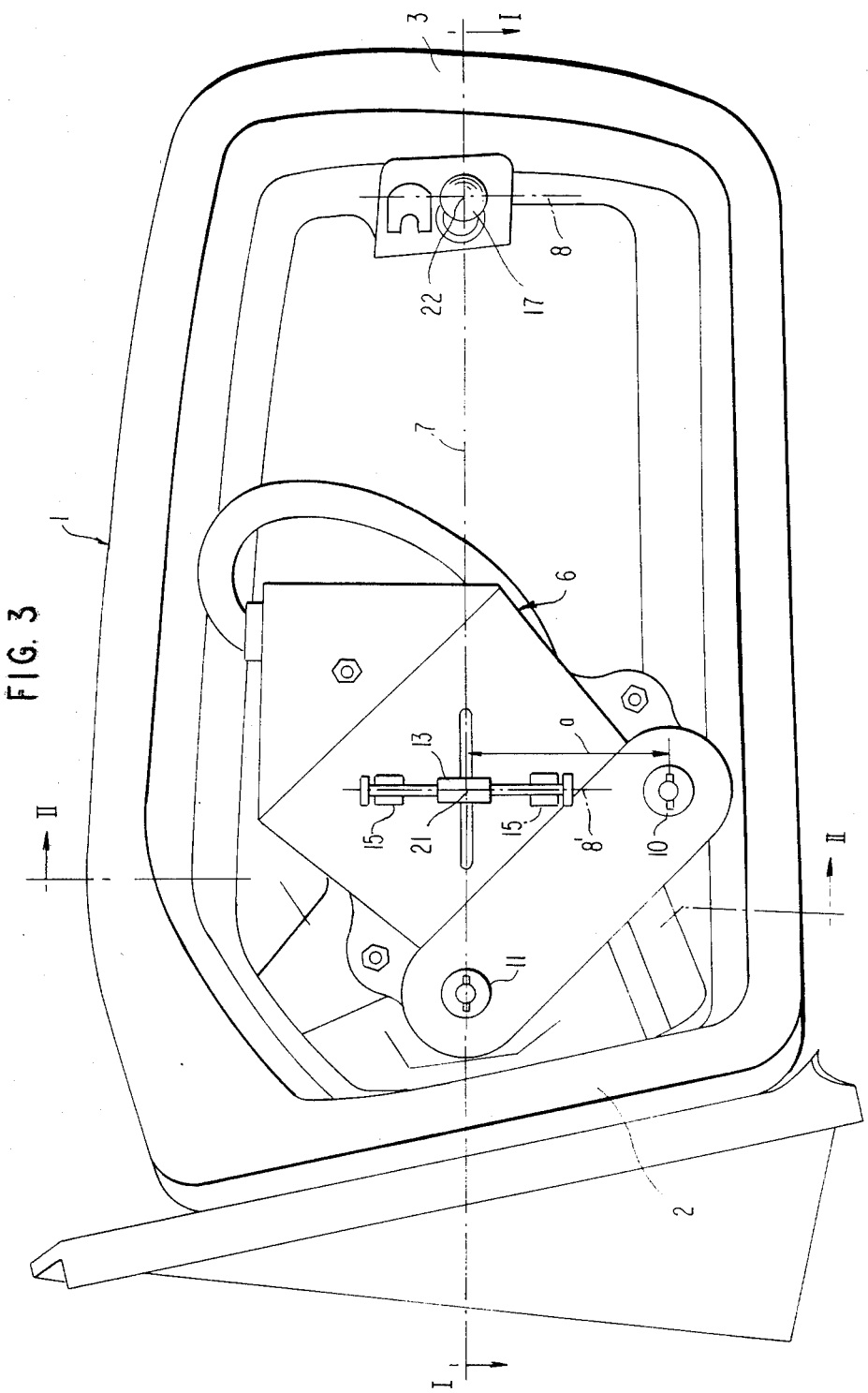
FIG. 3 is a view into the mirror housing of FIG. 1 without the mirror shell and the plate.

The drive unit 6 has two small electric motors, each of which drives by means of a reduction gear a unit in which a screw moves as a driven member 10, FIG. 2, or 11, FIG. 1, perpendicularly to the plane of the reflector. Furthermore, a plate 9 is hung on gimbals of the housing of the drive unit 6. The position of this thusly defined bearing point 21, FIG. 1, is chosen such that the driven horizontal member 10 and the bearing point 21 lie on a horizontal swivel axis 7, FIG. 3, and the driven vertical member 11 and the bearing point 21 lie on a vertical swivel axis 8'. The driven members 10 and 11 designed as screws have a spherical head with a cross pin for torsional strength. This spherical head engages in a ball cup 12, FIG. 1, on the back of plate 9. In the specific embodiment shown, the cardan suspension at bearing point 21 is formed by a swivel pin cross 13 whose pins engage in a pair of horizontal pin cups 14 on the back of plate 9 or in a pair of vertical pin cups 15 on the housing of the drive unit 6. This type of cardan suspension is configured at right angles to the direction of the reflector 5. If there is adequate space, suspension a ball cup would also be conceivable.

For the sake of completeness, it is pointed out that the type of drive unit itself is of no consequence at all for the purposes of this invention. The most varied design principles are known from the prior art, e.g., belt drive, eccentric drive, fluid drive, etc.

To obtain the widest possible bearing area for the mirror shell, drive unit 6 is relocated with the two driven members 10 and 11 and the bearing point 21 as far as possible in the direction of the vehicle-side housing edge 2. In the area of the opposite external housing edge 3 there is provided, separately from the first bearing point 21 of plate 9, another gimballed bearing point 22 for the mirror shell 4. This second bearing point 22 is formed by a ball pivot 17 on the mirror housing 1 and by a ball cup 16 on the mirror shell 4 which can be clipped over the ball pivot 17.

It would be conceivable to let both driven members 10 and 11 of the drive unit 6 act directly on the back of the mirror shell 4. However, this would mean that in the case of an insulated drive of the driven vertical member—in order to pivot the mirror shell 4 on a vertical axis—the pivoting would in reality occur on an inclined axis determined by the bearing point 22 and the spherical head of the driven horizontal member 10. Thus, meaningful adjustment and setting of the mirror by means of a simple control switch is no longer possible.

Figure 4:
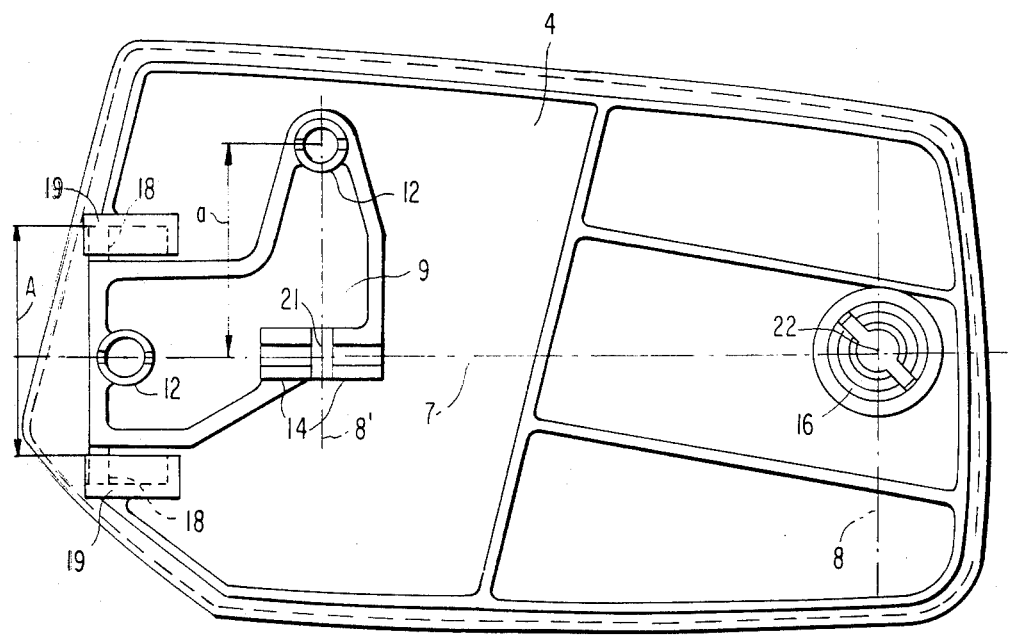
FIG. 4 is a view of the rear of the mirror shell with the plate attached thereto.

Because of the plate 9 which is inserted in accordance with the invention and which is movably coupled to the back of the mirror shell 4, a meaningful mirror adjustment by means of a simple control switch is possible by coupling the plate 9 to the mirror plate so as to turn on a vertical swivel axis, thereby making length adjustment between plate 9 and mirror shell 4 in the direction of horizontal axis 7 possible. In the specific embodiment shown, the swivel connection is formed by two vertical swivel pins 18 on plate 9 which are in alignment with, and point away from, one another. Owing to their axial distance A, FIGS. 2 and 4, they form a retention base about horizontal axis 7 which, in the specific embodiment shown, corresponds approximately to the distance a, FIG. 3, between the first bearing point 21 and the driven horizontal member 10. The swivel connection on lateral areas of mirror shell 4 is formed by two recesses 19, FIGS. 1 and 4, which correspond to and receive the swivel pins 18 and which extend in horizontal direction. The swivel pins 18 engage in the recesses preloaded and able to swivel but with allowance for lateral movement, so that length adjustment between plate 9 and mirror shell 4 in horizontal direction is possible. This length adjustment is necessary because, when the mirror shell 4 pivots on vertical axis 8 through the second bearing point 22, the recess moves on a larger radius than swivel pins 18. The swivel pins 18 and the recesses are symmetrical with respect to horizontal swivel axis 7, that is to say, half the axis distance lies above, and the other half below, horizontal axis 7.

Widthwise, the swivel connection lies approximately in the area where driven vertical member 11 is coupled to plate 9, that is to say, as seen in FIG. 1, the swivel pins 18 lie approximately to the left of the point at which the driven vertical member 11 is applied to the plate 9. Thus, a fairly large proportion or almost all of the stroke of driven member 11 is transferred to mirror shell 4.

The advantages of the invention are seen in the fact that the mirror shell, despite its broad dimensions, is supported without vibrations, that, viewed in a horizontal direction, a substantially wedge-shaped convergent mirror housing 1 can be used, and that a simple control switch is necessary for the control of the drive unit 6 itself and for a meaningful adjustment of the mirror. Furthermore, this type of mirror housing can also be employed for mounting a manually operated adjusting linkage through the vehicle-side housing edge.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. An adjustable servo-controlled outside rear view mirror for vehicles, having a stationary mirror housing and a mirror shell carrying the reflector and able to move therein, a drive unit for the vertical and horizontal adjustment of the reflector which is detachably fixed in the mirror housing in the area of the back of the mirror shell, said drive unit having a plate mounted thereby by ball and socket means, the plate being connected to the mirror shell for movement with respect thereto, wherein movable driven members of servomotors engage the plate at points disposed substantially horizontally and substantially vertically at a distance with respect to a bearing point for movement of the members substantially at right angles to the surface of the reflector, characterized by the combination of the following features:

(a) the connection between the plate and the mirror shell is designed such as to pivot on a vertical axis but with torsional strength in a horizontal direction, so that length adjustment is possible in the horizontal direction between the plate on the one hand, and the mirror shell on the other;

(b) the mirror shell is mounted by a ball and socket means to the mirror housing on a separate, second, bearing point located in substantial horizontal alignment with the bearing point of the plate;

(c) the plate is disposed within the mirror housing in close proximity to a housing edge proximate the vehicle body, and the second bearing point in close proximity to a housing edge remote from the vehicle body.

2. The outside rear view mirror as set forth in claim 1, characterized in that the connection between the plate and the mirror shell is formed, on the one hand, by two vertical swivel pins which are in alignment with, and point away from, each other and are spaced apart on the plate, and, on the other hand, by two corresponding horizontal recesses on the back of the mirror shell which receive the swivel pins.

3. The outside rear view as set forth in claim 2, characterized in that the axial distance (A) of the two swivel pins is substantially equal to, or larger than, the distance (a) between, on the one hand, the bearing point of the plate, and the point vertically with respect thereto at which the corresponding driven member of a corresponding servomotor is applied.

4. The outside rear view mirror as set forth in claim 2, characterized in that both swivel pins and both recesses are symmetrical with respect to the horizontal swivel axis of the mirror shell.

5. An adjustable outside rear view mirror having a mirror housing mounted to a vehicle at a vehicle housing edge and having an external housing edge remote from the vehicle housing edge, a reflector, means for reducing vibration of the reflector comprising a mirror shell means fastened to the reflector for moving said reflector, means for supporting the mirror shell means at a first point on said mirror housing proximate the external housing edge, plate means for supporting the mirror shell means on a first axis, the plate means being movable with respect to the mirror shell means and the reflector and proximate the vehicle housing edge, means engaging said plate means at a second point proximate said axis and horizontally disposed with respect to said first point for moving said reflector about a second axis passing through said first point, and means engaging said plate means at a third point remote from said second point for moving said reflector about a third axis passing through said first point.

* * * * *